Aug. 26, 1952  J H. HUNT  2,608,236
VEHICLE WHEEL
Filed April 12, 1946

INVENTOR.
J HAROLD HUNT
BY
ATTORNEY

Patented Aug. 26, 1952

2,608,236

UNITED STATES PATENT OFFICE 2,608,236

VEHICLE WHEEL

J Harold Hunt, East Lansing, Mich., assignor to Motor Wheel Corporation, Lansing, Mich., a corporation of Michigan Application April 12, 1946, Serial No. 661,719

1 Claim. (Cl. 152—406)

This invention relates to vehicle wheels, particularly to those wheels including a tire retaining flange which can be removed to permit dismounting of the tire from the rim.

The principal object of the invention is to provide a wheel of the above character which is of particularly rugged yet simple construction.

A further object is to provide a wheel in which the load bearing disk is permanently secured to the rim and forms a part of the gutter in which a removable tire retaining bead seat and flange is located.

These objects will more fully appear in the following specification when read in connection with the accompanying drawings, wherein:

Figure 3 is a fragmentary cross-sectional view taken on substantially the line 3—3 of Figure 1;

Figure 1:
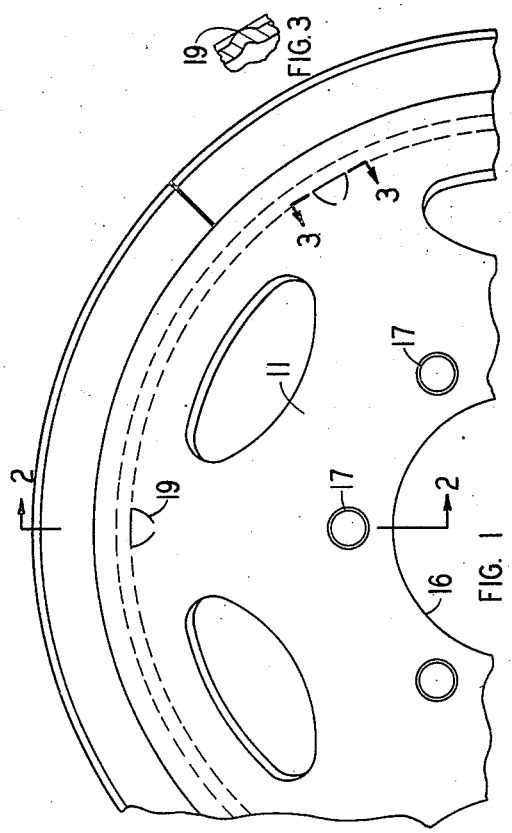
Figure 1 is a fragmentary front elevational view of a wheel embodying the invention.
Figure 2:
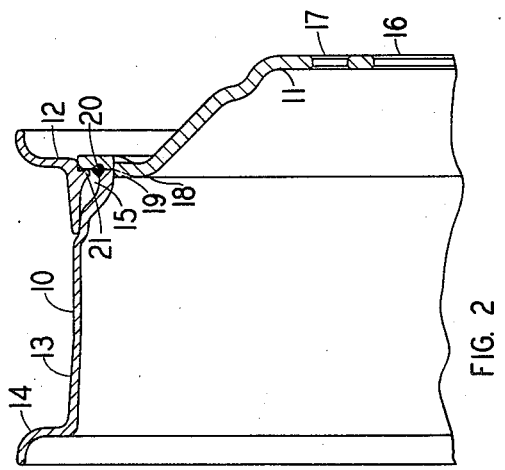
Figure 2 is a cross-sectional view taken on substantially the line 2—2 of Figure 1.

Figures 1 to 3 of the drawings illustrate a wheel comprising an annular rim, a load bearing disk 11 and a removable tire retaining flange and bead seat member 12.

The rim 10 is an annulus, preferably of rolled section, having a tapered integral tire bead seat 13 and an integral tire retaining flange 14 at one edge thereof. At the opposite edge is a radially inwardly depressed annular rabbet forming the bottom and axially inner side of a gutter 15, the purpose of which will appear presently.

The load bearing disk 11 is a pressed metal member of the cross-sectional configuration shown in Figure 2. At its center is a hub receiving opening 16. At angularly spaced intervals around the opening 16 are bolt openings 17 which receive bolts or cap screws for demountably attaching the disk to a hub (not shown) of a wheel.

The diameter of the disk 11 is somewhat greater than the diameter of the axial extremity of the rim forming the gutter. Preferably the diameter of the disk is about the same as the diameter of the rim proper. Thus, the outer perimetral portion forms the axially outer wall of the gutter 15 when the disk is juxtaposed to the last named axial extremity of the rim.

It will be noted that the disk is pressed axially inwardly to form a narrow annular rib 18 just radially inwardly of the rim gutter. Then at angularly spaced intervals the radially outer side of the rib is bent sharply axially inward to provide locating bosses 19. The radially outer extremities of the bosses 19 engage the radially inner surface of the bottom of the gutter whereby to accurately position the disk and rim relative to each other. The disk and rim are then welded together by a circumferentially continuous weld 20 in the outer corner of the gutter 15.

The tire bead seat and tire retaining flange member 12 is a split ring of angular cross section as shown in Figure 2. The bead seat portion thereof overlies the greater portion of the gutter and the outer perimeter of the disk 11. A radially inwardly extending rib 21 extends into the gutter and engages the axially inner surface of the disk 11.

The manner of mounting and dismounting the tire relative to the rim is conventional. When the ring 12 is removed the tire is pushed onto the rim, and the split ring 12 is then mounted over the outer perimeter of the disk 11 which forms the outer wall of the gutter. The tire is inflated to force the tire beads onto the bead seats and against the tire retaining flanges. To dismount the tire the latter is deflated, the tire bead overlying the ring 12 is pushed inwardly, the ring pried up to release the rib 21 from the gutter, and the tire removed.

Figure 4:
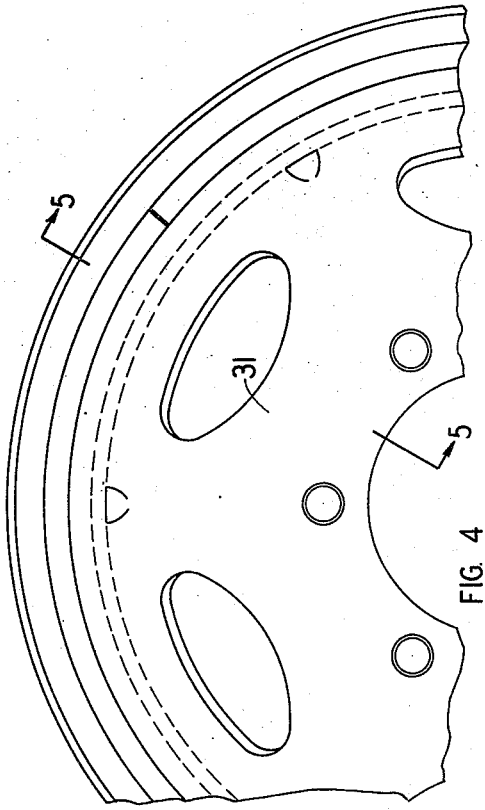
Figure 4 is a fragmentary front elevational view of a wheel embodying a modified form of the invention.
Figure 5:
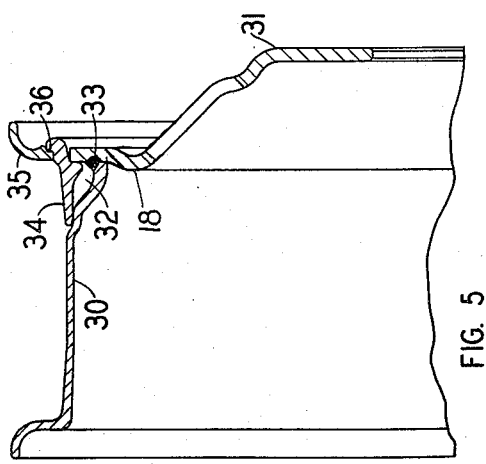
Figure 5 is a cross-sectional view taken on substantially the line 5—5 of Figure 4.

Figures 4 and 5 illustrate a slightly modified form of wheel embodying the invention, in which the tire bead seat and retaining flange are separate from each other.

The wheel illustrated comprises a rim 30 and a wheel body 31, both exactly like the corresponding parts 10 and 11 previously described. The rim is depressed adjacent one edge and the edge of the wheel body extends radially outward to provide a gutter 32. Rim and wheel body are welded together at 33.

A split ring 34 of the cross-sectional configuration shown in Figure 5 forms the tire bead seat. The tire retaining flange 35 is a continuous ring, also of the cross-sectional configuration shown in Figure 5. The latter is held in a rabbet 36 adjacent the axially outer extremity of the tire bead seat. The major portion of the ring 34 axially inwardly of the rabbet 36 is of less diameter than that of the bottom of the rabbet to permit the tire retaining flange 35 to be mounted on and dismounted from the ring 34 in a well known manner.

When the tire retaining flange 35 and split ring are off of the wheel, the tire is placed on the rim and pushed toward the integral tire retaining flange. The tire retaining flange 35 is then placed against the adjacent side of the tire and pushed past the gutter 32 in the rim. The split ring 34 is then placed in position on the wheel. Since the ring 34 is split it expands to permit such placement. After the split ring 34 is in place as shown in Figure 5, the tire retaining flange 35 moves across the split ring to its proper seating position on the split ring as the tire is inflated.

The tire is removed by reversing the aforementioned procedures.

From the foregoing it will be apparent that the present invention is particularly simple, the wheel proper consisting of only two parts, which form the rim, load bearing disk and gutter. The structure is especially rugged and is very economically manufactured.

The scope of the invention is indicated in the appended claim.

I claim:

A wheel comprising an annular rim having an integral tire retaining side flange at one side thereof and a radially inwardly depressed annular rabbet at the other side thereof forming only the bottom and axially inner side of a gutter, a load carrying disk permanently fixed to the axial circumferential extremity of said gutter bottom, said load bearing disk being of greater diameter than the diameter of said gutter bottom and projecting radially beyond said gutter bottom throughout the entire circumference of the gutter bottom whereby said projecting circumferential portion of said disk alone forms the axially outer side of said gutter, and a separate tire retaining flange member removably installed in said gutter, said load bearing disk being provided with a plurality of angularly spaced axially inwardly extending bosses located radially inwardly of said rim and engaging the latter.

J HAROLD HUNT.

REFERENCES CITED

The following references are of record in the file of this patent:

UNITED STATES PATENTS

| Number | Name | Date |
|---|---|---|
| 1,086,330 | Midgley | Feb. 3, 1914 |
| 1,416,149 | Williams | May 16, 1922 |
| 1,419,170 | Putnam | June 13, 1922 |
| 1,493,040 | Klaus | May 6, 1924 |
| 1,604,596 | Odenkirk | Oct. 26, 1926 |
| 1,704,524 | Williams | Mar. 5, 1929 |
| 2,363,182 | Hunt et al. | Nov. 21, 1944 |
| 2,488,864 | Handy | Nov. 22, 1949 |

FOREIGN PATENTS

| Number | Country | Date |
|---|---|---|
| 260,326 | Italy | 1928 |